United States Patent [19]
Johnson

[11] Patent Number: 4,556,143
[45] Date of Patent: Dec. 3, 1985

[54] CONVEYOR

[75] Inventor: Peter A. Johnson, Everett, Wash.

[73] Assignee: Figgie International Inc., Willoughby, Ohio

[21] Appl. No.: 554,451

[22] Filed: Nov. 22, 1983

Related U.S. Application Data

[63] Continuation of Ser. No. 249,739, Mar. 31, 1981, abandoned.

[51] Int. Cl.⁴ .............................................. B65G 17/00
[52] U.S. Cl. .................................. 198/841; 198/817; 198/860.1
[58] Field of Search ............... 198/860, 861, 817, 841, 198/831, 838, 836

[56] References Cited

U.S. PATENT DOCUMENTS

| | | |
|---|---|---|
| 1,206,305 | 11/1916 | Cowley . |
| 1,380,916 | 6/1921 | McBride . |
| 1,939,862 | 12/1930 | Preble . |
| 2,021,748 | 11/1935 | Schaefer . |
| 2,045,912 | 6/1936 | Howison . |
| 2,290,981 | 7/1942 | Maguire et al. ..................... 198/836 |
| 2,319,617 | 1/1939 | Manierre . |
| 2,652,143 | 9/1953 | Van Doren . |
| 3,596,752 | 8/1971 | Garvey . |
| 3,605,994 | 3/1970 | Parlette ........................... 198/841 X |
| 3,620,355 | 11/1971 | Jones et al. . |
| 3,669,247 | 6/1972 | Pulver . |
| 3,788,457 | 1/1974 | Valentino, Jr. ..................... 198/836 |
| 3,848,732 | 11/1974 | Catalano ............................... 198/861 |
| 3,885,837 | 5/1975 | Mellor .............................. 198/841 X |
| 3,944,059 | 3/1976 | Garvey . |
| 3,964,800 | 6/1976 | Grimes et al. . |
| 4,164,283 | 8/1979 | Flajnik . |
| 4,358,010 | 11/1982 | Besch ................................... 198/838 |

OTHER PUBLICATIONS

Conveyor Sales & Mfg. Co., LPCII, LPCI Conveyor brochure.
Beverage World Magazine, Jul. 1979.
Modern Materials Handling, May 20, 1980 Issue.
Pomona Service & Supply Co. brochure.
The Polymer Corporation, Ultra-Wear brochure.

Primary Examiner—Joseph E. Valenza
Assistant Examiner—Dennis Williamson
Attorney, Agent, or Firm—Wood, Herron & Evans

[57] ABSTRACT

A chain conveyor includes a chain with hold down attachments, at least one elongated guide, supporting and guiding the chain in an upper portion, and secured at a lower portion to an elongated mounting element. The guide and mounting element include cooperating structure for connecting the two together. The mounting element is secured on a conveyor frame section in a standard position and the guide is slid into the element, producing accurate alignment between guides of each section. Curved sections include shortened mounting elements disposed on conveyor cross-ties and defining a curved path for a curved guide.

5 Claims, 9 Drawing Figures

CONVEYOR

This is a continuation, of application Ser. No. 249,739, filed Mar. 31, 1981, now abandoned.

This invention relates to conveyors, and more particularly to conveyors which include a flexible chain engaging the underside of articles and pulling them along a conveyor path.

It is now well known in the conveyor art to pull a flexible chain over a guide and to move articles supported by the chain along the direction of chain movement. Also, it is known to fit a side bow chain with top flanges, such as in table top chain conveyors, to provide a moving conveyor flow capable of turning corners in a horizontal plane. These conveyors simply support the top flanges in slidable fashion. Such chain drawn conveyors are frequently used in relatively light duty circumstances, such as in conveying rolls of tissue, or for bottle and can handling.

In chain conveyors where an endless chain is used as a direct article supporting and conveying element, it is extremely important to control the chain through its conveying run and its return run to the conveying start point. If the chain is not adequately guided and supported, the conveyed article may not be consistently controlled, the chain may drag causing undue wear and significantly increased drag forces which might overtax the chain drive, or the chain may pull out of its track as it runs through a curved portion.

Accordingly, it is extremely important to positively control, support, and guide the chain throughout its runs.

Also, and while numerous devices have been proposed to mount and provide chain guides on conveyors, it is important to provide chain guides which adequately support and guide the chain, but which are, as well, easily assembled to the conveyor to provide optimum chain alignment to reduce drag and hang-ups and to reduce manufacturing costs.

One known form of chain guide for such conveyors comprises an extruded plastic material form providing a chain roller support rail and adjacent, inwardly opening elongated slots for slidingly capturing chain holdown tabs mounted opposite each other on the chain. Such guides are known to have inwardly turned mounting feet with a slot therebetween and bolts are used such that their heads fit over the feet to secure the guides to the conveyor cross-ties. In addition, guide sidewalls extend downwardly coextensively with the feet for guide support purposes.

These types of guides present several difficulties, particularly in the erection and mounting of the guides. In such guides, for example, it is necessary to slide bolts into the mounting slots, align them with holes in the cross-ties, and then individually secure each bolt. Moreover, depending brackets are used to similarly mount lower guides for the return run of the chains, and these guides must be similarly individually bolted to each of these brackets.

In addition, coupling strape are used between the ends of abutting guides and are bolted to the guides similarly to the guide mounting bolts. The requirement of individually bolting the guides and couplings to each mounting point take time, and requires exacting attention to guide alignment for both upper and lower runs.

Moreover, the guide sidewalls add to the quality of material necessary to form the extruded guide and thus increase its cost.

Finally, the numerous nuts, bolts, brackets and straps produce dirt holding crevices which are difficult to wash down for conveyor cleaning.

Accordingly, it has been one objective of this invention to provide an improved chain conveyor.

A further objective of this invention has been to provide an improved chain guide for a chain conveyor.

A further objective of the invention has been to provide improved apparatus for mounting a chain guide to a conveyor.

A still further objective of the invention has been to provide a method for manufacturing a chain conveyor.

To these ends, a preferred embodiment of the invention comprises an elongated chain guide and a cooperating, elongated mounting element for mounting the guide on a conveyor structure. The chain contemplated for use may be any suitable commercially available chain and is preferably provided with transversely extending, alternating hold-down tabs.

A preferred chain guide comprises a plurality of upper and lower elongated flanges which are joined by respective sidewalls to form opposed U-shaped slots opening toward each other. The top flanges do not meet, but form a chain path guide therebetween, and between the opposed slots.

The chain slides in the guide path and its rollers are supported by an elongated rib extending upwardly toward the chain guide path between the opposed U-shaped slots. The hold-down tabs are disposed within the opposed U-shaped slots, and the chain is held, in part, above the upper flanges for conveying purposes.

The unique bottom portion of the guide includes two downwardly pending flanges having outwardly extending feet at their bottom. These flanges extend downwardly just from either side of the elongated chain roller guide rib mentioned above.

An elongated chain mounting element is provided in order to secure the guide to conveyor structure. The element preferably comprises a channel member having sidewalls and flanges defining an upright, U-shaped slot. This channel is welded to the conveyor structure, such as to cross-ties, and the guide is simply slipped into it, the bottom mounting flanges and outwardly extending feet fitting within the upright, U-shaped slot of the channel.

This structure greatly simplifies manufacturing of the conveyor since it permits the conveyor to be made up in a number of standard sections, the channels welded thereto, in a standard jig, for example, and the guides simply slipped in. Thereafter, the conveyor sections are simply butt joined together by bolting together face-to-face end plates disposed at the section ends, the guides being in operable alignment since the mounting elements are disposed in the same relative position on each section.

Additionally, inverted guides for the return run of chain beneath the conveyor run are mounted to the same cross-ties of the conveyor in the same way, and slidably support the chain hold-down tabs as the chain moves through its return run.

In this manner, the elongated mounting elements provide the entire support for the guides and it is not necessary to include sidewalls in the guides lower portion for support. The element also closes off the lower portion of the guide and facilitates conveyor washdown and cleaning.

This particular guide and mounting structure greatly facilitates manufacturing of conveyor curves. In such curves, according to the invention, the elongated mounting channel is replaced by a plurality of short channels lenths or segments having the same cross-sections as the elongated channels for straight sections. These segments are mounted on cross-ties of the conveyor through the curve. In this manner, a curved guide can be slid onto the conveyor with the advancing end feeding into, and being captured by, the segments of mounting channel.

From this disclosure, it will be appreciated that the invention provides a solid accurate guide mounting for a propelling chain in a chain conveyor. Such mounting does not require separate bolts for each mounting point, and each conveyor section can be manufacture in standard jigs or clamps, or example, with the channels mounted in close alignment tolerances so that separate sections, including the guides, can be manufactured under close factory tolerances and thereafter easily erected in the field without alignment difficulties.

These and other advantages of the invention will becomes readily apparent from the following written description of a preferred embodiment thereof, and from the drawings in which:

GENERAL CONVEYOR STRUCTURE

Figures 1, 2, 3:
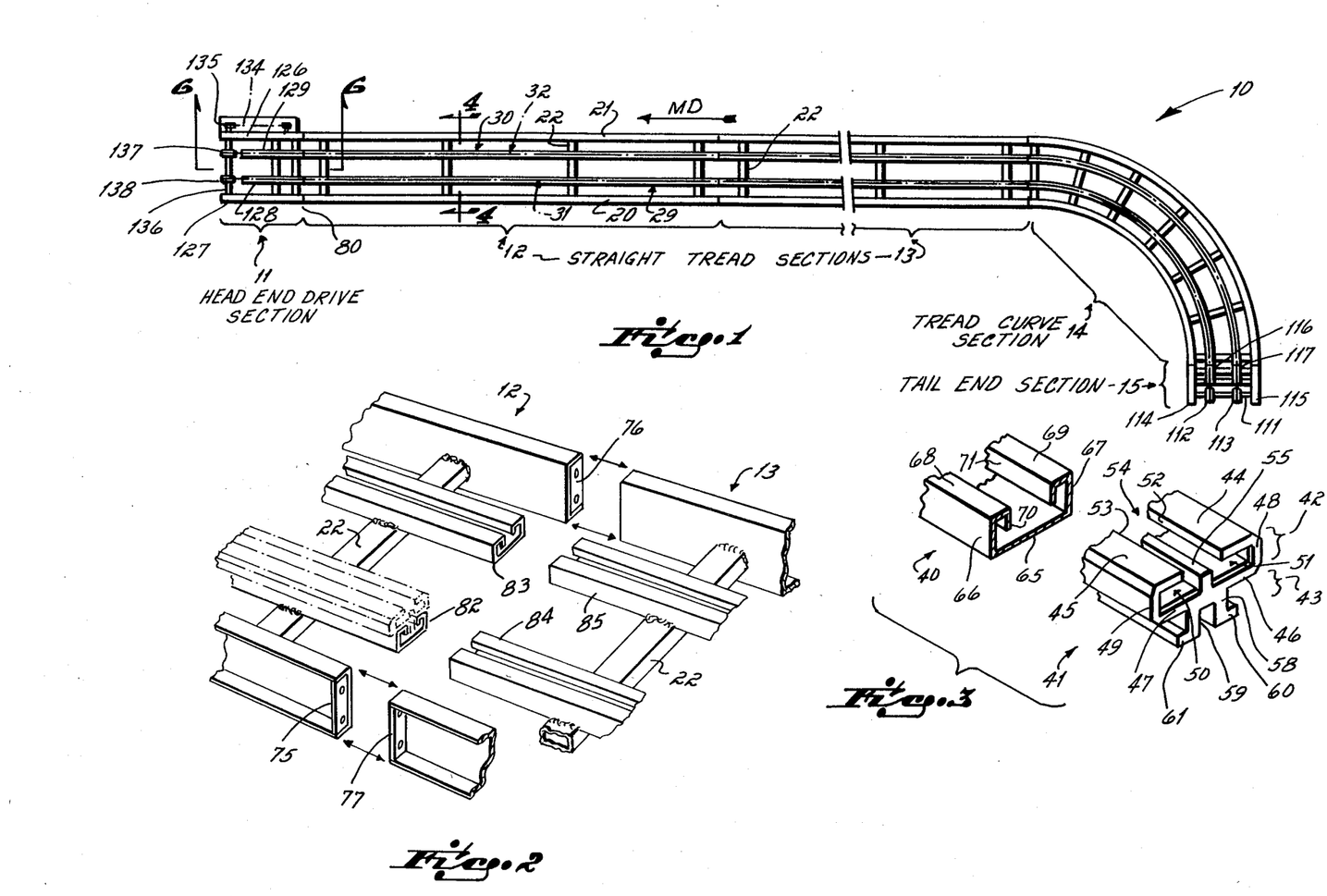
FIG. 1 is a plan view of a conveyor system, according to the invention of several conveyor sections.
FIG. 2 is an exploded isometric view showing the details of the coupling of two conveyor sections together.
FIG. 3 is an exploded isometric view showing fit of the guide into the mounting channel.

Turning now to the drawings, there is shown in FIG. 1 thereof a conveyor 10 made according to the invention. The conveyor 10, as illustrated in FIG. 1, includes a head end drive section 11, intermediate straight tread sections 12 and 13, a tread curve section 14, and a tail end section 15. The conveyor 10 as shown in FIG. 1 is illustrative only and it should be appreciated that the invention includes conveyors of many different types of configurations having various straight and curved sections. A break is shown in the tread section 13, for example, to simply illustrate that the conveyor 10 could include any number of straight and curved sections therein, only two straight sections being shown for the purpose of clarity in the figures.

Figure 4:
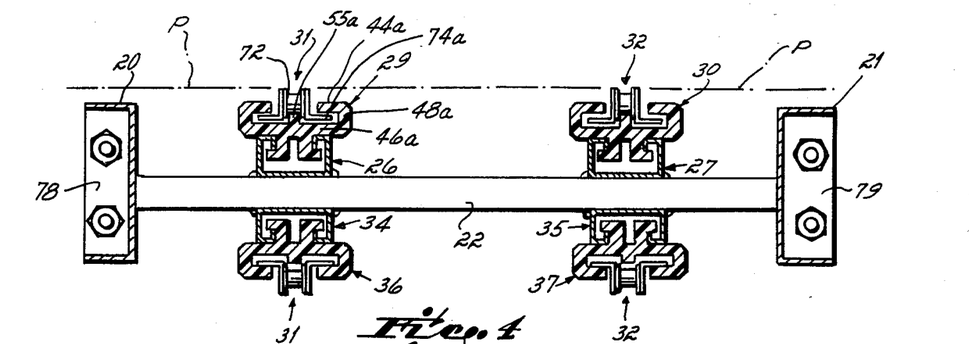
FIG. 4 is a cross-section view taken along lines 4—4 of FIG. 1.

As shown in FIG. 1 and in FIG. 4, each section of the conveyor preferably comprises spaced parallel side rails 20 and 21, joined and secured together by means of one or more cross-ties 22. Preferably and particularly for use in light-duty conveying situations, the side rails 20 and 21 are manufactured from formed metal channels opening outwardly and having inwardly facing webs. The cross-ties 22 are simply rectangular tubular members welded between the webs of the channels 20 and 21.

FIG. 4 illustrates more details of the conveying mechanism. Specifically, elongated mounting elements 26 and 27 are secured to cross-ties 22 by means of welding. These elongated metal elements are disposed on the cross-ties within conveyor rails 20 and 21 for the purpose of securing the mounting elongated chain guides 29 and 30.

Each of the respective chain guides 29 and 30 is constructed so as to support and secure a conveying chain 31 or, in the case of guide 30, chain 32 therein. It will be appreciated that the chains 31 and 32 have portions which extend upwardly above the respective elongated chain guides. It is these portions of the chain which convey articles which are placed thereon. The details of the chain will be more particularly described further on in this description.

Similarly to the elongated guides 26 and 26 and their respective chain guides, additional elongated mounting elements 34 and 35 are secured to the bottom of crosstie 22 by means of welding, for example. Each of these elongated mounting elements support respective chain guides 36 and 37, and these chain guides also support respective return runs of chains 31 and 32.

From this description it will be appreciated that the chains 31 and 32 are endless flexible propelling members having a top conveying run which is supported, for example, in the chain guides 29 and 30 respectively, and lower respective return runs which are supported, for example, in the respective lower chain guides 36 and 37. The conveyor runs lie in a plane P (FIG. 4).

As seen in FIG. 4, it will be appreciated that the upper conveying run of each respective chain 31 and 32 is shown disposed slightly above the upper portion of the side rail channels 20 and 21. Such conveyors are suitable for carrying pallets, cases or the like which may extend beyond the side rails 20 and 21. Alternate configurations are of course possible to utilize larger channels or to reposition the cross-tie 22 so that the channels extend above the conveying runs and thus provide side guides for the conveyed articles.

The details of the elongated mounting members or elements and the chain guides are perhaps best seen in FIG. 3. One end of an elongated mounting element or member 40 and an elongated chain guide 41 is shown in FIG. 3. These are identical to the mounting elements and guides such as shown in FIG. 4.

Chain Guide

The elongated chain guide 41 comprises an upper section 42 and a lower section 43. The upper section 42 includes the chain supporting and guiding structure of the guide 41, while the lower section 43 comprises the mounting apparatus of the chain guide 41. Upper section 42 includes upper flanges 44 and 45 and lower flanges 46 and 47, joined together by respective sidewalls 48 and 40. The flanges 45 and 47, together with sidewall 49, form an inwardly opening U-shaped slot 50. The flanges 44 and 46, together with the sidewall 48, form an inwardly opening U-shaped slot 51. The slots 50 and 51 are closed at their outer ends, but open toward each other.

The inner ends 52 and 53 of the respective upper flanges 44 and 45 terminate short of each other and form therebetween a chain receiving or guiding slot 54, which is elongated in the same direction of elongation as the entire chain guide member 41.

On the other hand, the lower flanges 46 and 47 lie in the same plane and are integrally joined centrally of the chain guide 41. An elongated chain roller supporting rib 55 is disposed at the juncture of the lower flanges 46 and 47 and extends upwardly therefrom just beneath the chain guide slot 54.

Returning now momentarily to FIG. 4, it will be appreciated that the elongated rib 55a, shown therein, has a height sufficient to support the chain rollers and maintain the chain 31 and the various elements of the chain above the lower flanges of the chain guide 29.

The lower portion 43 of the chain guide 41 includes two depending mounting flanges 58 and 59 which extend downwardly from the lower flanges 46 and 47, just outboard of the central position of the rib 55. Each of the mounting flanges 58 and 59 includes an elongated, outwardly extending foot 60 and 61, respectively, at the lower end of the mounting flange. The mounting flanges and the feet serve to maintain the elongated chain guides 41 within the elongated mounting element 40 as hereinafter described.

The elongated chain guide 41 is preferably manufactured from an ultra-high molecular weight plastic material. Such material has been determined to provide significant strength and wear reduction properties when used in connection with supporting a conveyor chain. One such material found to be particularly suitable is a material identified with the trademark "ULTRA-CLADD", by the Scranton Plastics Laminating, Incorporated, of Scranton, Pa. This material is a true ultra-high molecular weight material extruded, sold and guaranteed by that company to have a molecular weight of 4–5 million.

Chain Guide Mounting Element

The elongated chain guide mounting element 40 will now be described. As shown in FIG. 3, the mounting element 40 comprises a channel-like member having a lower web 65, respective sidewalls 66 and 67, and respective upper flanges 68 and 69. Further, flanges 70 and 71 extend downwardly from the respective upper flanges 68 and 69, so that as shown in FIG. 3 the elongated mounting element 40 defines an upright, U-shaped slot.

Perhaps as best seen both in FIGS. 3 and 4, the elongated chain guide may be disposed within the elongated mounting element such that the outwardly extending feet 60,61 are disposed directly beneath the flanges 70 and 71 of the mounting element and the guide is captured within and on the mounting element. It will be appreciated that the lower flanges 46 and 47 of the chain guide are supported by the sidewalls 66 and 67 of the mounting element, and by the upper flanges 68 and 69 of the elongated mounting element 40. This will be appreciated particularly from FIG. 4 showing the cross-section of the chain guide assembled to the elongated mounting elements and having a structure which is identical to that described in FIG. 3 (which shows the separated chain guide and mounting element for the purpose of illustration).

The Chain

Returning now to a description of the preferred chain utilized, it will be appreciated that many varied types of chains can be used in such a conveyor. One chain, however, which has a particular utility in the conveyor described herein is a chain manufactured by The Rexnord Chain Division of Rexnord, Inc. and identified as a C-2050 chain provided with A-1 lug attachments in alternating directions of extension on every other chain link. Such a chain and link is described for example, in Rexnord's catalogue, entitled *REX Power Transmissions and Conveying Components,* Catalog R74, at page 35. These attachments are ordinary items of commerce. The A-1 attachments mentioned include a normal chain side link having a lug extending transversely of the side plate in an outward direction from the chain. These lugs are preferably disposed on alternate sides of the chain and at every other chain link.

Figure 5:
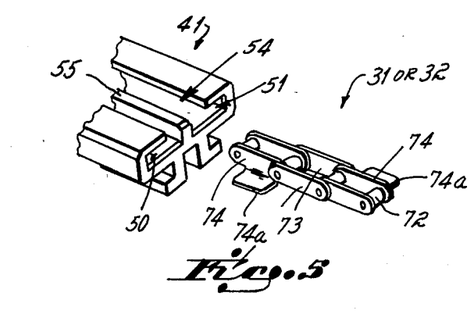
FIG. 5 is an isometric view of a preferred chain and guide according to the invention.

As shown then in FIG. 5, the chain includes a plurality of rollers 72, secured between chain side plates or links 73 and between A-1 side plate attachments 74 having lugs 74a extending therefrom in the alternating and opposed sequence as shown.

As perhaps best seen in FIG. 4, the chain in this particular orientation with respect to its guide is shown in the upper lefthand portion of FIG. 4. There it can be seen that the chain roller 72 is disposed in the guide such that the roller is engaged and supported by the elongated chain roller support rib 55a. In the optimum configuration, the support rib 55a supports the chain structure so that it does not bodily engage any other part of the guide. In particular, as shown in FIG. 4, the lug 74a is captured within the U-shaped slot of the guide formed by the flanges 44a, 46a and sidwall 48a. However, in its optimum configuration, the lug does not contact any of these flanges on the interior surfaces which define the inward opening U-shaped slot. In addition, it should be appreciated that the lugs 74a extend downwardly below the normal length side plates of the chain. Thus the rib 55a is particularly configured to be at such a height as to support the roller a predetermined distance from the lower flange 46a, for example, in order to permit the lug 74a to ride freely in the slot.

Of course, as the chain is drawn about any curved section, such as that shown in FIG. 1 as section 14, the chain may be urged to the inside of the guide so that the outside of the chain tends to pull up and outwardly of the guide. This force, urging the chain outwardly of the guide, is effectively resisted by engagement of the lug 74a against the upper flanges of the guide, whenever such force occurs.

Adjoining Tread Sections

FIG. 2 illustrates the assembly of one completed tread section to another, a guide being shown only in phantom for purposes of clarity. In FIG. 2 one tread section, such as tread section 12, for example, may be assembled to tread section 13 by simply bringing the ends of the sections together and joining them by securing end plates 75 and 76 of tread section 12 to the associated facing end plates on section 13, (only plate 77 being shown in FIG. 2). Similar end plates 78 and 79 are shown in the cross-section of the view of FIG. 4.

It will be appreciated, of course, that the end plates 78 and 79 are disposed at the juncture 80 (FIG. 1) of tread section 12 with the head and drive section 11.

When the sections of the conveyor are joined together, it is very important that the chain guides associated with each section of the conveyor are in operative alignment with each other so that as the chain is drawn therethrough, it does not jam or hit any projecting parts in the path of the chain. Accordingly, it will be appreciated that each section can be made in a welding jig or the like which serves to secure the cross-ties 22 within the conveyor rails at the same elevation on the rails in each section. Moreover, it will be appreciated, as shown in FIG. 2 for example, that the elongated mounting elements 82 and 83 thereof are disposed on their respective cross-tie 22 in the same lateral distance from the side rails as are the elongated mounting elements 84 and 85 in the tread section 13. Also, the end plates are uniform and are mounted and drilled uniformly.

In this manner, when the sections 12 and 13 are joined together by fastening of their respective end plates in adjacent relationship, the ends of the respective elongated mounting elements 82, 84 and 83, 85 will be in proper operative alignment. Since the elongated mounting elements are in proper alignment, it follows that the chain guides which they support will also be in alignment in order to provide an uninterrupted smooth flowing path for the chain and without adjustment at the erection site.

Of course, it will be appreciated that the chain guides are assembled to the conveyor sections within respective elongated mounting elements 82, 83, 84 and 85 prior to the joining of the tread sections together. The structure pictured in FIG. 2 is shown with a chain guide in phantom only for the purpose of clarity in order to illustrate the alignment features of the mounting element of the invention.

Curved Section

Figure 8:
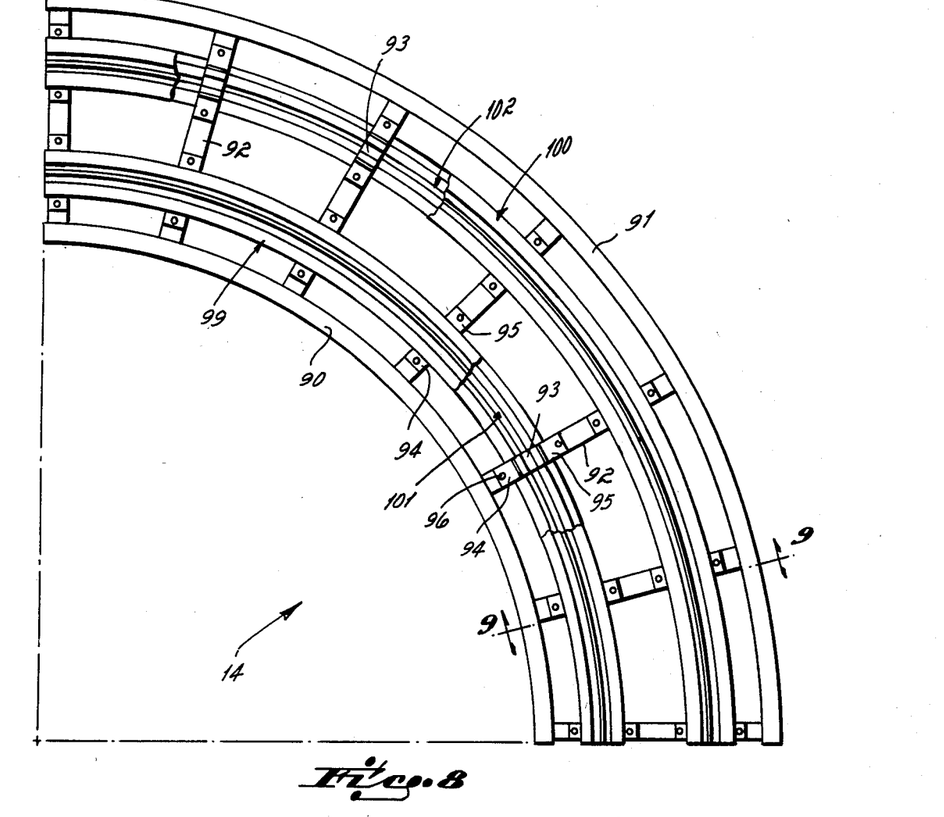
FIG. 8 is a plan view of a curved section according to the invention with portions of the top guide removed.
Figure 9:
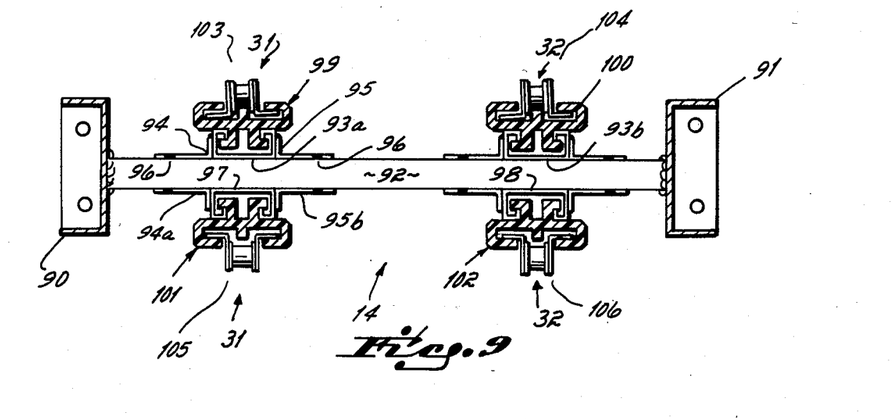
FIG. 9 is a cross-sectional view taken along lines 9—9 of FIG. 8.

Turning now to FIGS. 8 and 9, these figures illustrate plan and cross-sectional views of the tread curve section 14. The tread curve section 14 includes curved side rails 90 and 91 which are similar to the side rails 20 and 21 of the straight tread sections, with the exception of the fact that they are curved in the horizontal plane in order to provide the curved configuration of section 14. The side rails 90 and 91 are secured together by means of a plurality of cross-ties 92, which are also similar to the cross-ties 22 of the straight sections.

The curved sections differ from the straight sections principally in the manner in which the chain guides in the curve section are mounted therein. In particular, the curved section 14 utilizes a plurality of segmented or shortened mounting elements 93 in place of the single elongated mounting element for each of the chain guides as described in the straight conveyor sections. Accordingly, and in order to conform to the two conveyor runs utilized in the straight tread sections 12 and 13, each cross-tie 92 supports, on an upper side thereof, two mounting element segments 93, such as shown at 93a and 93b in FIG. 9.

Rather than welding these segments to the cross-ties, however, and in view of their smallness, it is presently preferable to weld the elements to opposed angles 94 and 95 disposed on each side of a segmented mounting element. These angles are provided with bolt holes 96 for the purpose of securing them to the surface of cross-ties 92. Of course, the mounting elements could be held on the cross-ties by any suitable jig or clamp means and welded in place.

In like manner, return chain runs are supported by chain guides secured in inverted mounting element segments such as shown at both 97 and 98 in FIG. 9. These too are preferably secured to the cross-ties by means of angles 94a and 95b welded to the mounting elements and bolted to the cross-tie.

The mounting element segments of both the conveying run and the return run, in cross-section, identical to the elongated mounting element 40 as shown in FIG. 3, however, they are of determinate length approximately equal for example, to the width of the cross-tie 92. Moreover, each of the mounting angles 94 and 95 are pre-drilled and are secured in the same position on the respective mounting element segments such that when the segments are mounted to the cross-tie 92, they are uniform in their position thereon such as illustrated in FIG. 8 and in FIG. 9. Chain guides respectively identified at 99, 100, 101 and 102 are secured to the mounting element segment as shown in FIG. 9. These provide and define upper chain conveying runs 103 and 104 and lower return runs 105 and 106, respectively, for the chains 31 and 32.

In the manufacture of the curved tread section, the cross-ties are secured between the rails 90 and 91 to support the rails in generally parallel or concentric configuration where the rails are spaced an equal distance throughout. Moreover, the mounting segments 93 are secured uniformly on the cross-ties to define the curved path for the utilization of curved chain guides 99–102 on their respective curved section. In assembly of the curved tread section 14, the cross-ties are preferably welded to the rails and the mounting segments can be secured thereto either before or after such welding. Thereafter, curved chain guides such as those depicted at 99–102 are inserted into the segments at the end of the curved section and are simply slid around the curve, engaging and being supported and captured by the respective segments as the curved guide is advanced. Once the respective guides are secured by the respective segments, the curved tread section is ready for assembly to the conveyor systems such as shown in FIG. 10. Of course, each of the curved rails 90 and 91 has at each end thereof an apertured face plate, such as that shown in connection with the straight section in FIG. 2, for the purpose of securing the ends of the curved section to additional remaining section.

Tail Section

The conveyor 10 as shown in FIG. 1 is terminated at the far end of the tread curved section 14 by means of the tail end section 15. The details of the tail end section 15 are similar to those for any of the straight sections such as 12 or 13. In addition, the tail section includes a shaft 111 and respective sprockets 112 and 113 mounted thereon. The shaft 111 is mounted between conveyor rails 114 and 115 which are similar to conveyor rails 20 and 21 of any straight section. The sprockets 112 and 113 are disposed so that an upper portion of the sprocket is in operative alignment with the paths of the respective chains 31 and 32 as they enter the conveying run chain guides 116 and 117 of the tail end section 15. The chains simply extend around the respective sprockets from the return run guides which are disposed beneath the chain guides 116 and 117 as shown in FIG. 1 in the same manner as the return chain guies described in connection with FIG. 4 of any straight section.

Head Section

Figure 6:
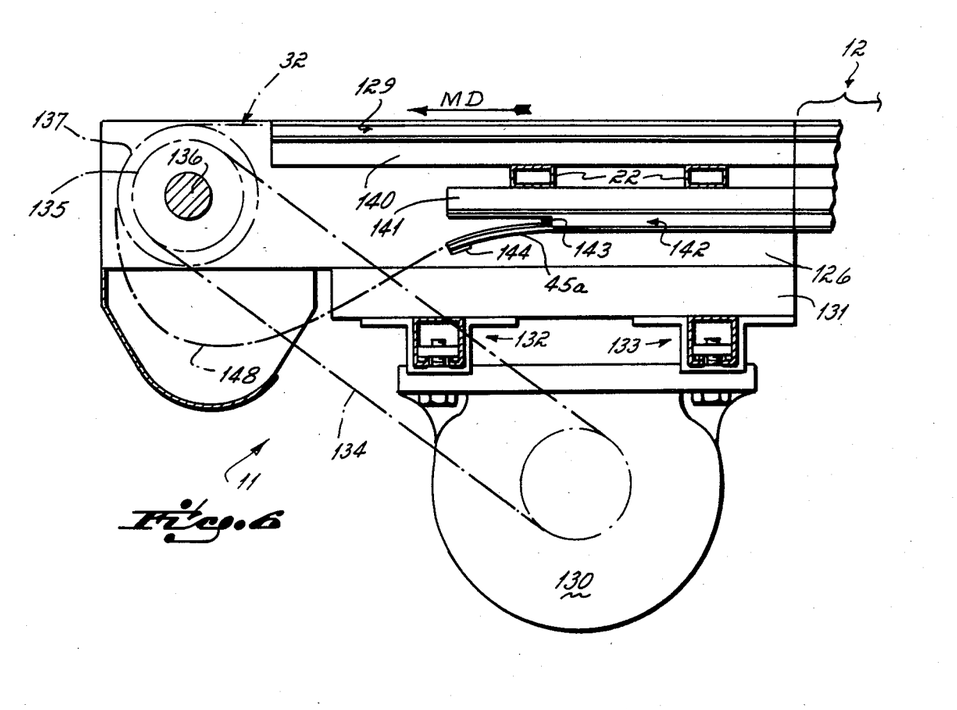
FIG. 6 is a cross-sectional view taken along lines 6—6 of FIG. 1.
Figure 7:
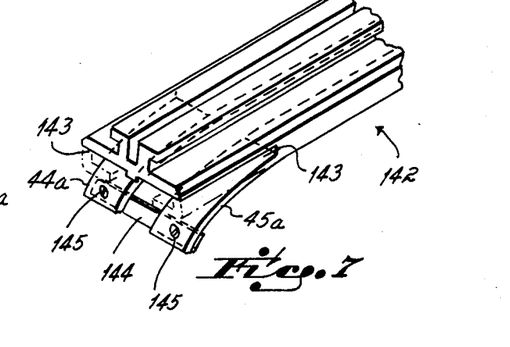
FIG. 7 is an isometric end view of a feed end of the chain guide for the return run of the chain.

The head end drive section of the conveyor 10 is best seen in FIG. 1 and in FIGS. 6 and 7. Considering FIG. 1, the head end drive section 11 includes straight side rails 126 and 127 similar to side rails 20 and 21 as previously described. The rails are secured together by means of cross-ties 22.

The head end drive section also includes elongated conveying chain guides 128 and 129 for supporting and guiding the conveying chains as they are drawn from straight section 12 onto the head end drive section 11. These guides are secured to the cross-ties by means of the elongated guide mounting elements such as that shown at 140 in FIG. 6. Such elements are identical to element 40 in FIG. 3.

A motor 130 (FIG. 6) is mounted beneath the side rails by means of brackets 131, 132 and 133. The motor is connected by means of a drive chain 134 to a drive sprocket 136. The drive sprocket 135 is disposed on the outer end of a shaft 136 which extends through the rails 126 and 127 (FIG. 1). Sprockets 137 and 138 are secured to the shaft 136 for driving the respective conveyor chains 31 and 32 in the machine direction indicated by the machine direction arrow in FIG. 6.

The chains are thus rolled through guides 128 and 129, onto respective sprockets 138 and 137, and are then introduced into return chain guides like that shown at 142 in FIG. 6.

As shown in FIG. 6 a return guide mounting element, such as that shown at 141, is provided for each chain and mounts an elongated return chain guide, such as that shown in 142 in FIG. 6. The conveying and return mounting elements are mounted on the cross-tie 22 in the same fashion as shown and described in FIG. 4. Considering the details of FIGS. 6 and 7, conveying chain guide 129 is mounted within mounting element 140, and a return chain guide 142 (for each chain) is mounted within mounting element 141 (for each chain). Chain guide 129 is identical to the guide 41 described in connection with FIG. 3, however, the guide 142 has a modified end to accommodate the chain catenary as shown in FIGS. 6 and 7.

FIG. 7 shows the inverted elongated return chain guide 142, which is identical for each chain. This guide has flanges 44a and 45a which have been cut away from and bent downwardly from the guide 142 by means of the cutout 143 on each side thereof. This cut has relieved the flanges so that they can be bent downwardly. The ends of the flanges are connected by a cross-tie or bar 144 which is secured to the ends of the flanges 44a and 45a by means of countersunk screws 145. The cross-tie bar 144 serves to maintain the rigidity of the flanges 44a and 45a, and to keep them in the same general curved path for the purpose of guiding the free caternary of the chains into their return run.

It will be appreciated that in the head end drive section as shown in FIG. 6, the chain 32 is pulled in the machine direction by means of the motor drive. As the chain is driven around the sprocket 137, it is permitted to fall from the sprocket in a caternary disposition 148, as shown in FIG. 6. Thereafter, the chain moves upwardly until the hold-down tabs 74a, as has been previously described, engage the depending flanges 44a and 45a on each side of the chain. These engage the hold-down tabs and guide the chain upwardly into the elongated return chain guide 142 so that the chain can then travel in the guides along its return run throughout the length of the conveyor.

Of course, no chain takeup nor any other adjustments are required since the caternary handles any excessive chain slack.

The invention as described incorporates a number of advantages. For example, it will be appreciated that each of the conveyor sections can be manufactured in a standard manner with the elongated mounting elements and the chain guides easily and accurately assembled to each section at the factory. Thereafter, at the use site, the sections are simply joined end-to-end to form the desired conveyor run and one or more chains are threaded through their respective conveying and return guides and joined end-to-end to form an endless conveying chain. This structure eliminates the assembly of the chain guides at the site and further does not require numerous brackets, mounting bolts and the like for securing the guide to the conveyor. Moreover, the structure provides for accurate chain guide alignment provided by supervised manufacturing steps at the conveyor plant, and does not rely on field assembly for this critical alignment.

Moreover, the chain guide and mounting element structure provide significant advantages. The guide requires only two mounting feet and no supporting sidewall. Such side support is provided by the mounting element which encloses the lower portion of the guide. The cost of the guide material is reduced, and the entire mount and guide are essentially closed, enhancing cleaning and washdown of the conveyor witout the dirt gathering crevices of exposed nuts, bolts and brackets.

The invention is applicable and adaptable to many different chain conveyor configurations. For example, the invention could be provided in a single central chain configuration having guide runners extending alongside each side of the chain. Alternately, the invention could be provided in a three or more chain conveying run configuration.

Also the conveyor can be modified to provide accumulation of conveyed articles by any suitable known means, such as selectively operable load lifting beams disposed just beneath the conveying runs and the loads thereon.

These and other advantages and modifications will be readily appreciated by those of ordinary skill in the art without departing from the scope of this invention and applicant intends to be bound only by the claims appended hereto.

I claim:
1. A conveyor including:
   at least two spaced apart side rails;
   cross-tie means securing said two rails together in substantially equidistant relationship;
   at least a first elongated mounting means extending in the same general direction as said side rails and including sidewalls and flanges defining an elongated, upright, U-shaped slot, said mounting means being disposed on said cross-ties;
   a flexible propelling member;
   a propelling member guide means disposed on said mounting means and extending in a similar direction thereto, said flexible propelling member movably mounted on said guide means, said guide means including an upper propelling member guide, support and capturing portion and lower mounting flanges disposed beneath said upper guide, support and capturing portion and having outwardly extending, elongated feet, said mounting flanges and said feet being slidably received and captured within said upright U-shaped slot;
   wherein said flanges of said mounting means engage said propelling member guide means outwardly of said lower mounting flanges thereof; and
   said sidewalls of said mounting means respectively extending downwardly from said propelling member guide means between respective outer edges thereof, and the respective outer edges of said outwardly extending feet.

2. A conveyor as in claim 1, wherein said flexible propelling member is endless and defines a conveying run and a return run, and wherein said conveyor further includes;
- at least a second elongated mounting means secured to selected cross-ties beneath the first elongated mounting means, and having sidewalls and flanges defining an inverted, U-shaped slot;
- a second flexible propelling member guide means secured to said second elongated mounting means for guiding and supporting said return run of said propelling member;
- said second flexible propelling member guide means comprising flange means defining a lower propelling member guide, support and capturing portion and upper mounting flanges disposed above said lower guide, support and capturing portion and having outwardly extending elongated feet, said mounting flanges and feet of said second guide means being slidably received and captured within said inverted, U-shaped slot.

3. A conveyor as in claim 2 including a plurality of conveyor sections adapted for coupling together to form a conveyor line of multiple joined sections, each section having an end structure including a coupling end plate disposed vertically therein, respective plates on respective sections being bolted together to operably join said sections; and
- said elongated mounting means of each section being secured to cross-ties therein in a standard position so as to be operably aligned with the elongated mounting means of an adjacent section when said sections are joined together, said guides disposed in said aligned elongated mounting means form at least a conveyor run for a single propelling member extending through said sections.

4. A conveyor as in claim 2 wherein said side rails are spaced apart and are curved to define a conveyor curve section, said guide means also being curved and disposed within said side rails, and said elongated mounting means comprising a plurality of segmented, spaced apart mounting elements, each one being mounted on a cross-tie in operative curved alignment with an associated segmented element on a next cross-tie, said segmented mounting elements defining a curved path conforming to the curved guide means associated therewith.

5. A conveyor comprising an elongated flexible propelling member, including hold-down tabs extending outwardly from said member, and an elongated guide means for guiding said propelling member, said propelling member including at least one portion extending outwardly from said guide means for conveying articles, said conveyor further comprising:
- means for mounting said elongated guide means on said conveyor and comprising elongated wall members and flanges defining a U-shaped slot;
- mounting flanges extending downwardly from and beneath said guide means inboard from outer edges thereof;
- each downwardly extending mounting flange having transversely extending feet means directed outwardly from said guide means; and
- said feet means being disposed and captured within said U-shaped slot beneath said guide means for securing said guide means to said mounting means;
- wherein said flanges of said mounting means engage said propelling member guide means outwardly of said downwardly extending mounting flanges thereof; and
- said sidewalls of said mounting means respectively extending downwardly from said propelling member guide means between respective outer edges thereof, and the respective outer edge of said outwardly extending feet means.

* * * * *

UNITED STATES PATENT AND TRADEMARK OFFICE
CERTIFICATE OF CORRECTION

PATENT NO. : 4,556,143

DATED : December 3, 1985

INVENTOR(S) : Peter A. Johnson

It is certified that error appears in the above-identified patent and that said Letters Patent is hereby corrected as shown below:

Column 2, line 1, "quality" should be --quantity--

Column 3, line 17, second occurrence of "or" should be --for--

Column 4, line 20, second occurrence of "26" should be --27--

Column 4, line 34, "conveyor" should be --conveying--

Column 4, line 60, "40" should be --49--

Column 7, line 68, after second occurrence of "run" insert --are--

Column 8, line 57, "guies" should be --guides--

Column 9, line 10, "136" should be --135--

Signed and Sealed this

Eighteenth Day of March 1986

[SEAL]

Attest:

DONALD J. QUIGG

Attesting Officer

Commissioner of Patents and Trademarks